United States Patent
Chang et al.

(10) Patent No.: US 11,193,478 B2
(45) Date of Patent: Dec. 7, 2021

(54) DIAPHRAGM PUMP AND VALVE PLATE THEREOF

(71) Applicant: Koge Micro Tech Co., Ltd, New Taipei (TW)

(72) Inventors: Po-Han Chang, New Taipei (TW); Shu-Hong Lin, New Taipei (TW); Hsien-Liang Cheng, New Taipei (TW); Kang-Hung Yeh, New Taipei (TW)

(73) Assignee: KOGE MICRO TECH CO., LTD., New Taipei (TW)

( * ) Notice: Subject to any disclaimer, the term of this patent is extended or adjusted under 35 U.S.C. 154(b) by 246 days.

(21) Appl. No.: 16/150,906

(22) Filed: Oct. 3, 2018

(65) Prior Publication Data

US 2019/0376503 A1 Dec. 12, 2019

(30) Foreign Application Priority Data

Jun. 8, 2018 (TW) .................................. 107119827

(51) Int. Cl.
*F04B 43/04* (2006.01)
*F04B 43/02* (2006.01)
(Continued)

(52) U.S. Cl.
CPC .............. *F04B 43/04* (2013.01); *F04B 43/02* (2013.01); *F04B 43/028* (2013.01); *F04B 45/04* (2013.01);
(Continued)

(58) Field of Classification Search
CPC ...... F04B 43/028; F04B 43/026; F04B 53/10; F04B 53/103; F04B 53/1087; F16K 15/02; F16K 15/021; F16K 15/023
(Continued)

(56) References Cited

U.S. PATENT DOCUMENTS 2,998,827 A * 9/1961 Cook ......................... F04B 1/14
137/543.13
4,915,017 A 4/1990 Perlov
(Continued)

FOREIGN PATENT DOCUMENTS

CN 201714643 U 1/2011
CN 206158970 U 5/2017
(Continued)

*Primary Examiner* — Philip E Stimpert
(74) *Attorney, Agent, or Firm* — Juan Carlos A. Marquez; Marquez IP Law Office, PLLC (57) ABSTRACT

A diaphragm pump includes a valve seat, a head cover covered on the valve seat, and a pair of valve plates. A surface of the valves seat is formed concavely with a first receiving trough with a first flow passage, and a second receiving trough with a second flow passage. One of the valve plates is disposed in the first receiving trough, and the other one is disposed in the second receiving trough. The first and second receiving troughs respectively have a geometric shape corresponding with that of the valve plate. The valve plate has a sealing part, and at least one extending arm extended outwardly from the sealing part. The sealing part has a geometric shape being bilaterally symmetrical. The extending arm has an arced end. A gap is existed between an edge of the valves plate and the first receiving trough or the second receiving trough.

13 Claims, 11 Drawing Sheets

(51) Int. Cl.
  *F04B 53/10* (2006.01)
  *F04B 45/04* (2006.01)
  *F16K 15/02* (2006.01)

(52) U.S. Cl.
  CPC ........ *F04B 53/103* (2013.01); *F04B 53/1087* (2013.01); *F16K 15/02* (2013.01)

(58) Field of Classification Search
  USPC ........ 137/528, 533, 533.29, 533.31; 251/332
  See application file for complete search history.

(56) References Cited

U.S. PATENT DOCUMENTS

| | | | | |
|---|---|---|---|---|
| 4,931,000 | A * | 6/1990 | Fleming, Jr. | F04B 43/026 417/413.1 |
| 7,284,572 | B2 * | 10/2007 | Kach | F04B 53/1062 137/859 |
| 8,523,144 | B2 * | 9/2013 | Pechtold | F16K 1/46 251/176 |
| 9,915,255 | B2 * | 3/2018 | Vosse | F04B 39/1073 |
| 2005/0155657 | A1 * | 7/2005 | Kach | F16K 15/16 137/859 |
| 2017/0321680 | A1 * | 11/2017 | Vosse | F04B 7/0046 |

FOREIGN PATENT DOCUMENTS

| | | |
|---|---|---|
| JP | 2006009646 A | 1/2006 |
| JP | 2007-194018 A | 8/2007 |
| WO | WO 2005088128 A1 | 9/2005 |

* cited by examiner

DIAPHRAGM PUMP AND VALVE PLATE THEREOF

CROSS-REFERENCE TO RELATED PATENT APPLICATION

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a diaphragm pump and a valve plate thereof, and more particularly to a diaphragm pump for conveying gas or liquid, and a valve plate disposed in the diaphragm pump for controlling the flow direction of gas or liquid.

BACKGROUND OF THE DISCLOSURE

A small device used to convey gas or liquid, such as a diaphragm pump, usually utilizes a working diaphragm which is driven upward or downward by a conveying mechanism to convey gas or liquid. In addition, the diaphragm pump usually includes a pair of valve plates for controlling input and output of gas or liquid, respectively.

Conventionally, the valve plates are received in a valve seat. To properly fix the valve plates, one way is to fix a single side, double sides, or a center of the valve plate. Alternatively, another way is to utilize a geometric shape of the valve seat to restrict the degree of movement freedom of the valve plate for providing a sealing effect.

Although the first way of fixing above can limit the center of the valve plate on a predetermined position, the disadvantage is that the valve plates rely on swinging an arm thereof to reach a sealing position. Such swinging movement of cantilever-type arm will result in a heavier load of the diaphragm pump system. Further, the degree of freedom of the swinging movement of the valve plate is affected greatly by the material and design. Since the opening-closing speed of the valve plate may not be able to keep up with the operation frequency of the diaphragm pump, the flow may be affected and the quality of mass production may not be stable. This manner of fixing is especially not adapted in a high-frequency diaphragm pump. Furthermore, the lifespan of the valve plate may also be affected, because the swinging manner of the valve plate causes elastic fatigue of the valve plate, which reduces the sealing effectiveness.

Although the second way of fixing above has no elastic fatigue problem due to the swinging movement, the disadvantage is that a center position of the valve plate cannot be effectively controlled, so that the valve plate may move along redundant paths during operation. Further, frictional resistance between the valve seat and the valve plate, due to the restrictive shape of the former, can lower operating effectiveness of the valve plate, which can lead to a poor sealing effect.

In order to improve the issues associated with the first way of fixing, one conventional valve plate is made of softer material, so as to increase the sealing effect and reduce the load of the diaphragm pump system. However, the softer material inversely brings about an excessive deformation of the sealing side of the valve plate, which increases the load of the conveying mechanism, and the non-sealing side of the valve plate blocks much more of the area of a flow outlet to affect the flow amount.

SUMMARY OF THE DISCLOSURE

In response to the above-referenced technical inadequacies, the present disclosure provides a diaphragm pump, which utilizes a valve plate and a valve seat with corresponding geometric structures, so that the valve plate provides a sealing effect with a shorter valid movement path and a smaller energy loss to effectively control a center position of the valve plate.

In one aspect, the present disclosure provides a diaphragm pump, which includes a valve seat, a head cover and a pair of valve plates. The valve seat is formed with a first receiving trough and a second receiving trough on a surface thereof in a concave manner. The first receiving trough has a first runner gate. The second receiving trough has a second runner gate. The head cover is covered on the valve seat. One of the valve plates is disposed in the first receiving trough, and the first receiving trough has a geometric shape corresponding with a geometric shape of the valve plate. The other one of the valve plates is disposed in the second receiving trough, and the second receiving trough has a geometric shape corresponding with that of the valve plate. The valve plate has a sealing part and at least one extending arm. The at least one extending arm extends outwardly from a partial periphery of the sealing part, the sealing part has a geometric shape being bilaterally symmetrical. The at least one extending arm has a protruded end. A gap is formed between the valve plate and the first receiving trough or the second receiving trough.

In one aspect, the present disclosure provides a valve plate of the diaphragm pump, which can provide a sealing effect with a shorter valid movement path and a smaller energy loss to effectively control a center position of the valve plate.

In certain embodiments, the present disclosure provides a valve plate which includes a sealing part, and at least one extending arm. The at least one extending arm extends outwardly from the sealing part in an identical width. The sealing part has two semi-circular arcs opposite to each other. The at least one extending arm has a protruded end. The valve plate has a flat upper surface and a flat lower surface.

Therefore, the present disclosure utilizes the valve plate with a geometrical structure corresponding with that of the valve seat, so as to effectively control a center position of the valve plate. The valve plate is therefore capable of providing a sealing effect with a shorter valid moving path and minor energy loss.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
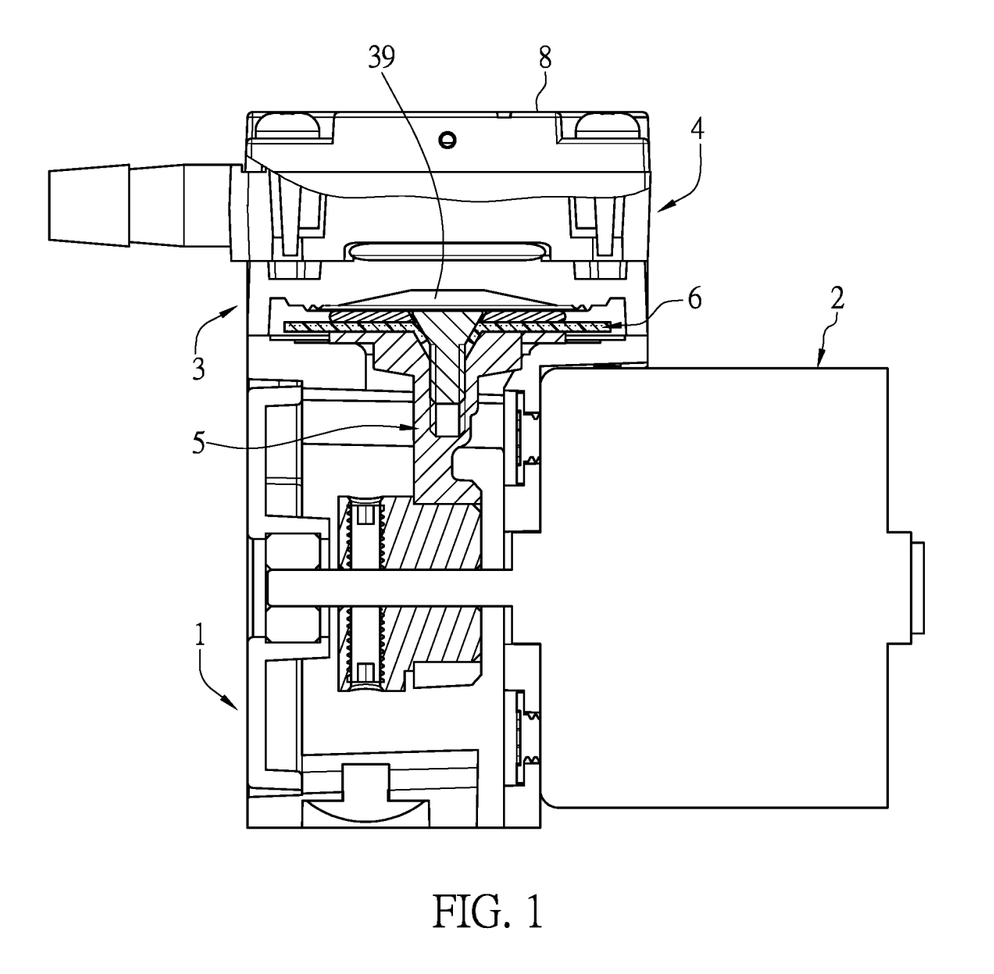
FIG. 1 is a partial cross-sectional view of a diaphragm pump of the present disclosure.
Figure 2:
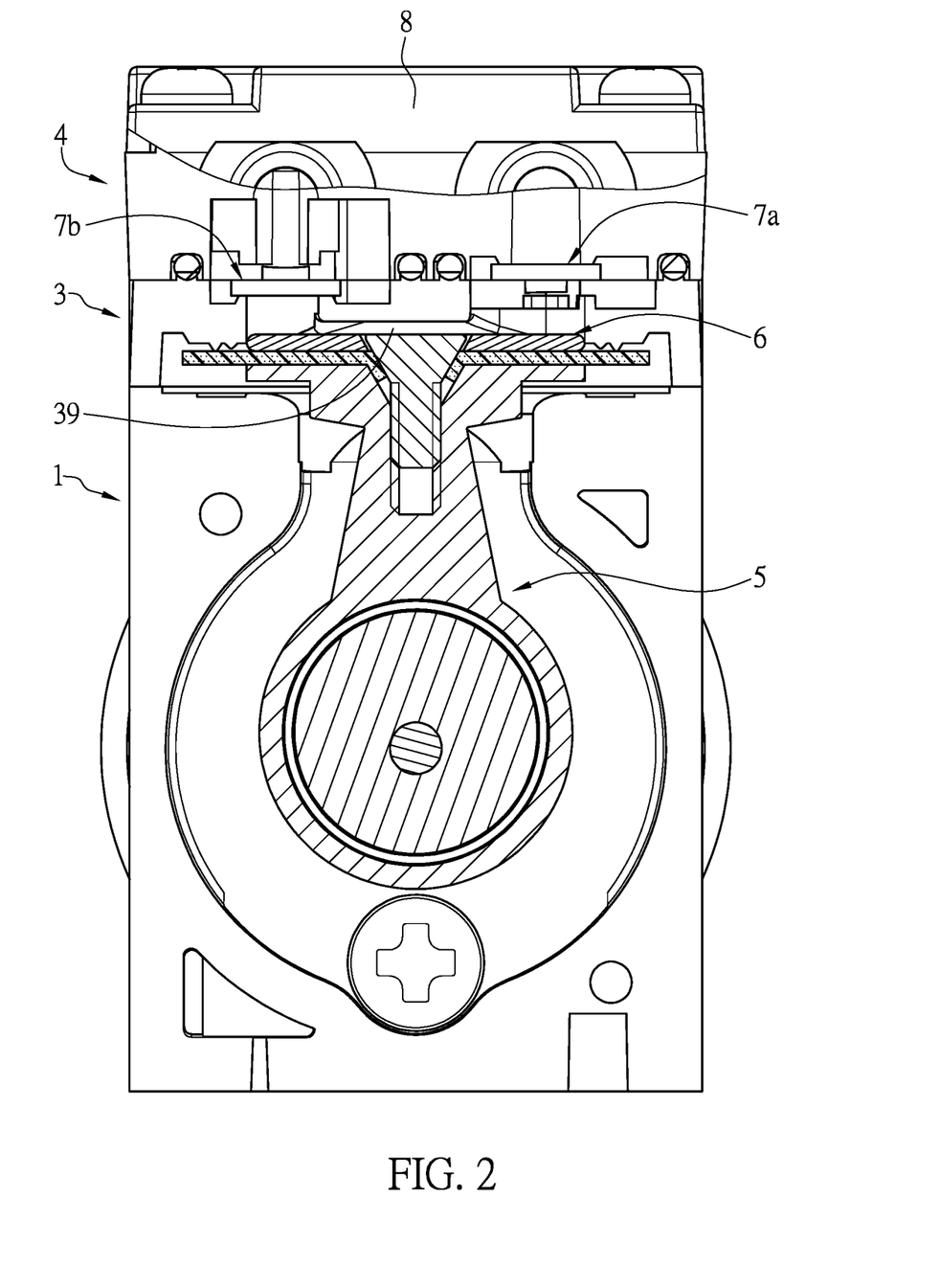
FIG. 2 is another partial cross-sectional view of the diaphragm pump of the present disclosure.

Referring to FIG. 1 to FIG. 2, the present disclosure provides a diaphragm pump, which includes a pump housing 1, a motor 2, a valve seat 3, a head cover 4, a linkage assembly 5, a diaphragm assembly 6, a pair of valve plates 7a, 7b, and an upper cover 8.

Figure 9:
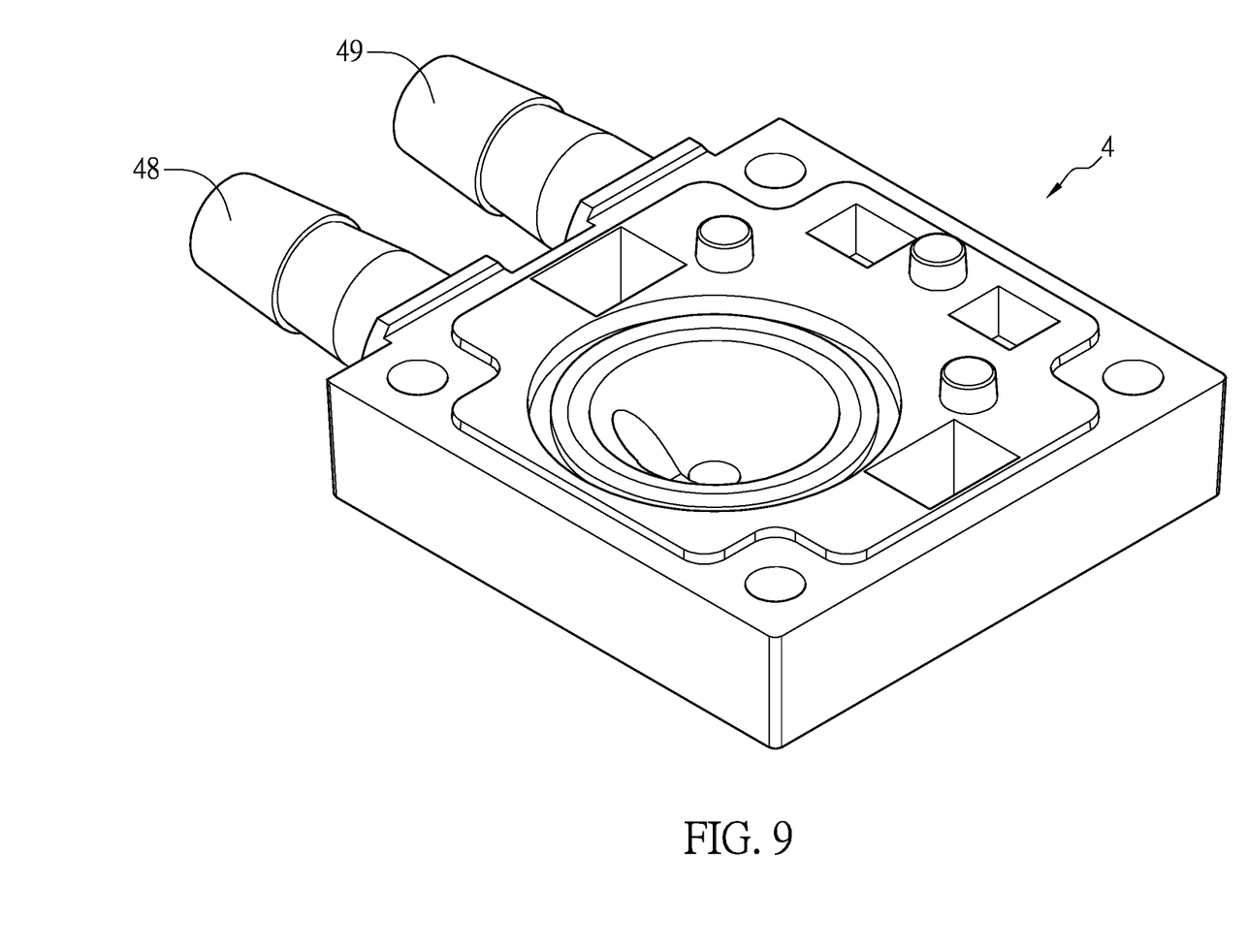
FIG. 9 is a perspective view of a head cover of the present disclosure.
Figure 10:
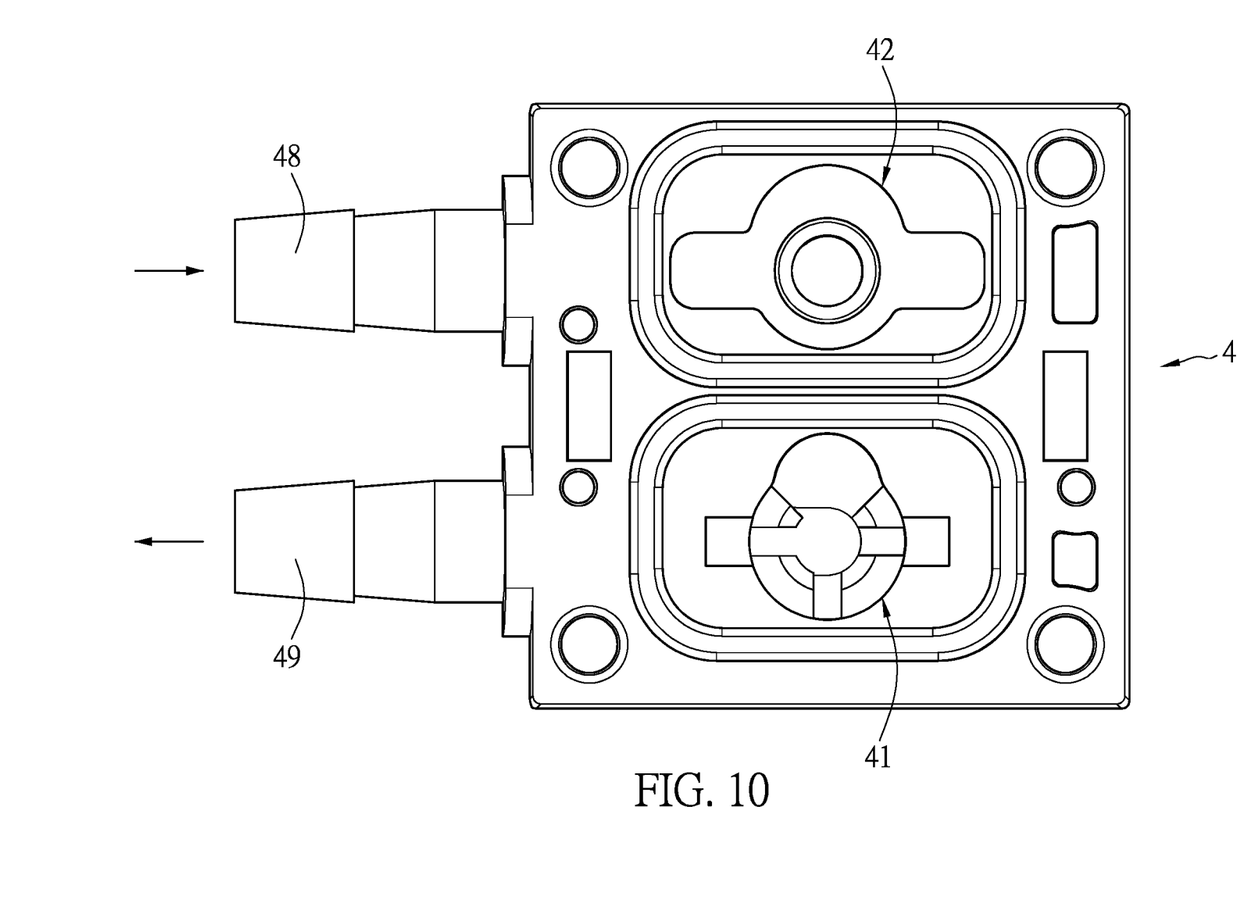
FIG. 10 is a bottom view of the head cover of the present disclosure.

The motor 2 is mounted on one side of the pump housing 1. The valve seat 3 and the head cover 4 are mounted on another side of the pump housing 1. The head cover 4 covers on the valve seat 3, and the upper cover 8 covers on an outer side of the head cover 4. The head cover 4 has an inlet port 48 and an outlet port 49, as shown in FIG. 9 and FIG. 10, which are used to input and output fluid, respectively. The pair of valve plates 7a, 7b are disposed between the valve seat 3 and the head cover 4. The diaphragm assembly 6 is received in the pump housing 1 and arranged under the valve seat 3. The linkage assembly 5 is arranged in the pump housing 1, and is connected between the motor 2 and the diaphragm assembly 6. The pair of valve plates 7a, 7b are capable of controlling the fluid to flow unidirectionally inward or outward, respectively. When the motor 2 operates, the linkage assembly 5 can be driven to move back and forth, so as to drive the diaphragm assembly 6 to vibrate reciprocally. Therefore, a volume of a cavity 39 between the diaphragm assembly 6 and the valve seat 3 is changeable. Consequently, by the cooperation of the pair of valve plates 7a, 7b, the fluid can be pumped in and out. The diaphragm pump utilizes the deformation of the diaphragm to change a volume variation of the cavity 39, so as to produce a negative pressure or a positive pressure. The negative pressure can pump the fluid to flow inside and the positive pressure can pump the fluid to flow outside. The fluid can be gas or liquid. The above-mentioned structure of the diaphragm pump is only one applicable embodiment of the present disclosure. However, the present disclosure does not limit the structure of the diaphragm pump.

Figure 3:
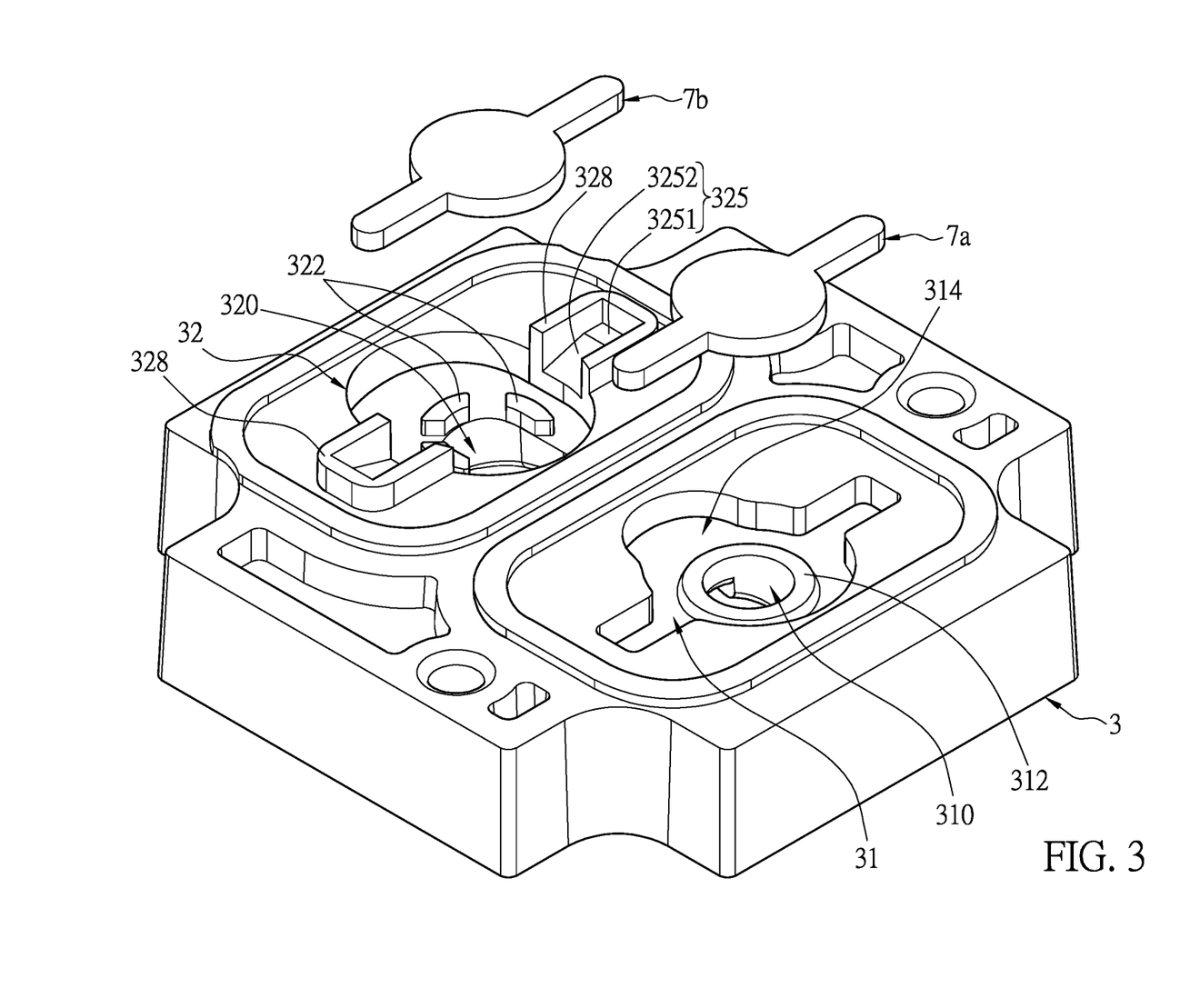
FIG. 3 is an exploded view of a valve seat and a valve plate of the present disclosure.

Reference is made to FIG. 3. In this embodiment, a top face of the valve seat 3 is formed with a first receiving trough 31 and a second receiving trough 32 in a concave manner. The first receiving trough 31 has a first runner gate 310, and the second receiving trough 32 has a second runner gate 320. The first runner gate 310 and the second runner gate 320 are fluidly communicated with the cavity 39 of the valve seat 3. In this embodiment, a close-shaped protruded wall 312 is formed at a periphery of the first runner gate 310 and is used to support a sealing part 73 of the valve plate 7a. The protruded wall 312 of this embodiment is shaped in a circular enclosing wall. A plurality of support knobs 322 are formed at a periphery of the second runner gate 320 in a non-enclosing manner and are used to support the sealing part 73 of the valve plate 7b.

Figure 4:
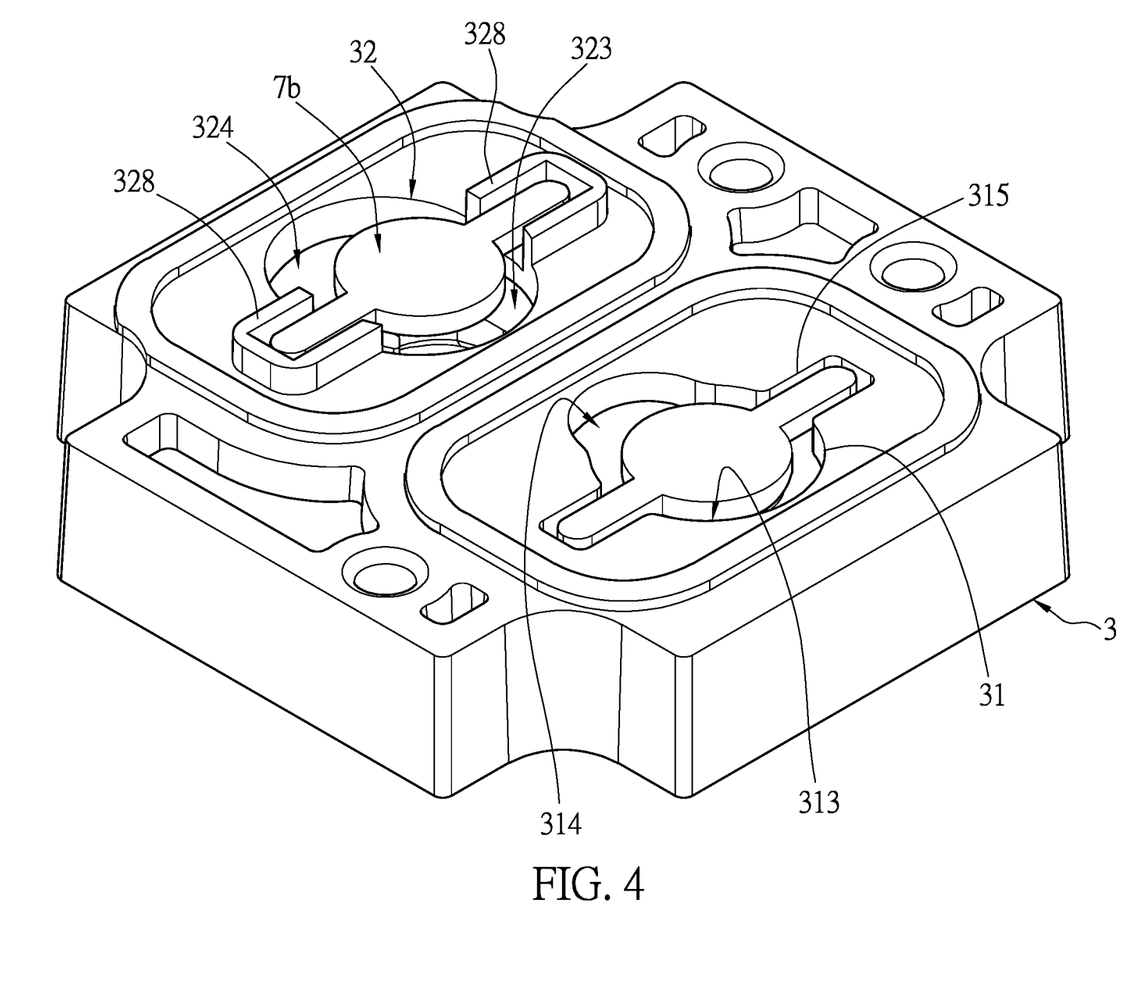
FIG. 4 is a perspective view of the valve plate assembled to the valve seat of the present disclosure.
Figure 5:
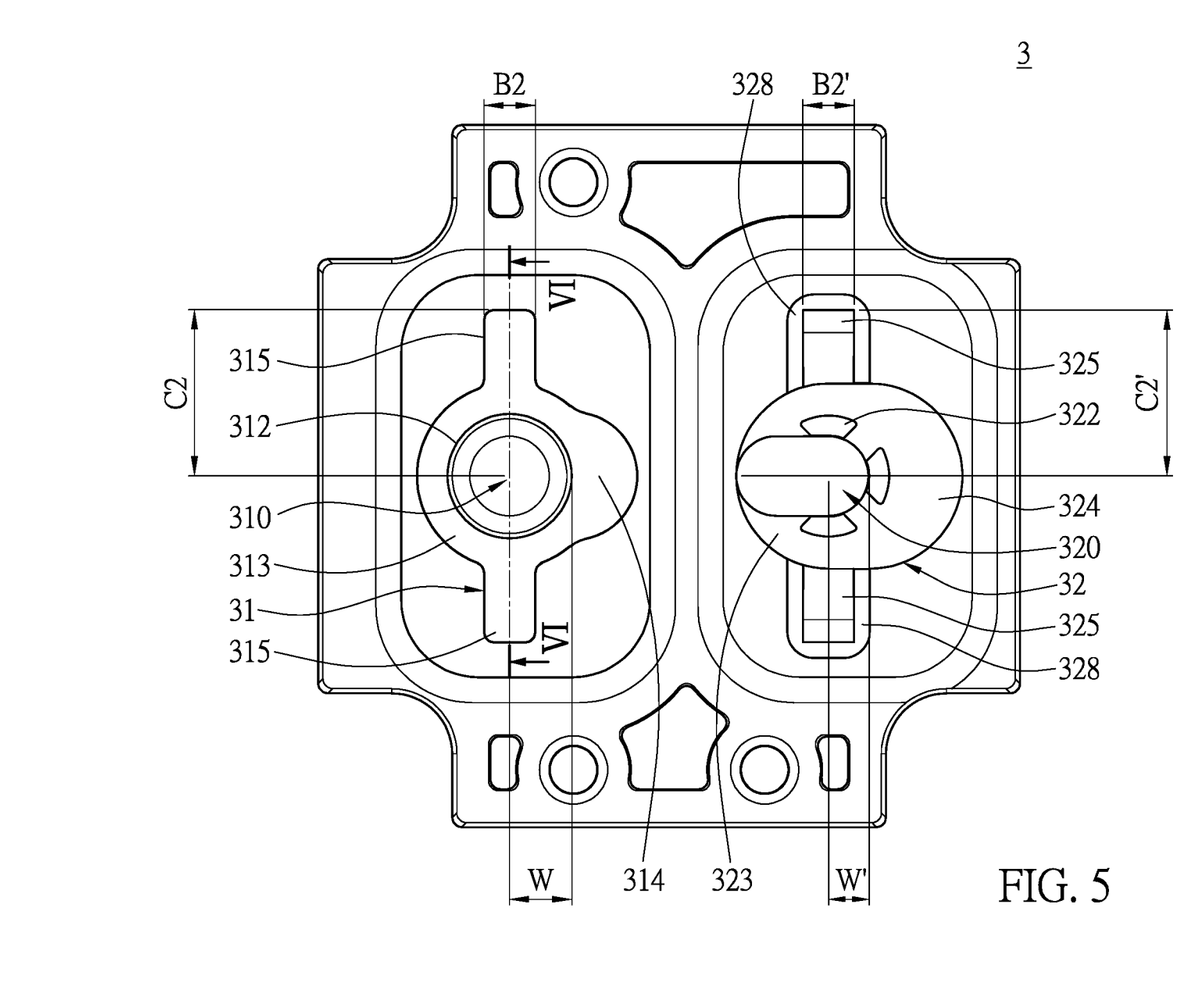
FIG. 5 is a top view of the valve seat of the present disclosure.

Reference is made with FIG. 4 and FIG. 5. A shaped of the first receiving trough 31 is substantially corresponds to that of the valve plate 7a, and includes a sealing-zone runner 313 formed at a periphery of the protruded wall 312, and a pair of extending zones 315 extending outwardly from the sealing-zone runner 313. The sealing-zone runner 313 is formed in an annular shape. In addition, the first receiving trough 31 further includes a buffering runner 314 which is fluidly communicated with one side of the sealing-zone runner 313. The buffering runner 314 and the sealing-zone runner 313 are substantially egg-shaped, which facilitates the flow of fluid in the buffering runner 314. In the embodiment, the first receiving trough 31 of the valve seat 3 is configured to allow the fluid to flow out. Preferably, an area of the buffering runner 314 is smaller than an area of the sealing-zone runner 313. A distance W between the buffering runner 314 and the sealing-zone runner 313, or a distance W' between a buffering runner 324 and a non-sealing-zone runner 323 is 0.2-0.7 times the diameter A1 of the sealing part 73 of the valve plate. Since the valve plate itself is elastic, the advantage of the design of this embodiment is that, a buffer zone formed by the buffering runner 314 is smaller than a runner zone formed in the sealing-zone runner 313, so that the valve plate 7a can be restricted to not separate from a sealing hole of the sealing-zone runner 313, thereby ensuring the sealing effect. In addition, the outlet and the inlet of the runner are arranged on the same axis. This design, that the buffer zone formed by the buffering runner 314 is smaller than the runner zone formed in the sealing-zone runner 313, can avoid increasing the passing route of the fluid and avoid decreasing the efficiency of fluid transportation.

A shape of the second receiving trough 32 substantially corresponds to a shape of the valve plate 7b, which can be divided into the non-sealing-zone runner 323 located at a periphery of the support knob 322, and a pair of extending zones 325 extending outwardly from the non-sealing-zone runner 323. In addition, the second receiving trough 32 further includes the buffering runner 324 which is fluidly communicated with one side of the non-sealing-zone runner 323a. The valve seat 3 has a pair of positioning walls 328. The pair of positioning walls 328 are formed around a partial periphery of the second receiving trough 32, so as to restrict the displacement of the valve plate 7b. In this embodiment, each positioning wall 328 is substantially U-shaped, but is not limited thereto. The buffering runner 324 of this embodiment aids the flow of fluid. According to the embodiment, the second receiving trough 32 is provided for fluid to flow into the valve seat 3. Preferably, an area of the buffering runner 324 is larger than or equal to an area of the non-sealing-zone runner 323, so that the fluid transfer efficiency can be enhanced.

Reference is made to FIG. 9 and FIG. 10. The valve seat 3 is covered with the head cover 4. The head cover 4 has a first upper chamber 41 and a second upper chamber 42. The first upper chamber 41 has a shape corresponding with that of the first receiving trough 31. The second upper chamber 42 has a shape corresponding with that of the second receiving trough 32.

One of the valve plates (7a) is disposed in the first receiving trough 31, and the first receiving trough 31 has a geometric shape corresponding with that of the valve plate 7a. The other one of the valve plates (7b) is disposed in the second receiving trough 32, and the second receiving trough 32 has a geometric shape corresponding with that of the valve plate 7b.

According to the present disclosure, the pair of valve plates 7a, 7b have the same geometric shape. The valve plates 7a, 7b are preferably made of an elastic material, such as plastic or rubber. Each of the valve plates 7a, 7b has a sealing part 73 and a pair of extending arms 75. The pair of extending arms 75 are outwardly extended from a partial periphery of the sealing part 73. In addition, the pair of extending arms 75 are outwardly extended from two opposite sides of the sealing part 73 in an identical width. This embodiment can have at least one extending arm 75, or can have multiple extending arms 75 extended outwardly in an isometric manner. The sealing part 73 has two symmetrical geometric shapes. The sealing part 73 has two opposite semi-circular arcs. The end of the extending arm 75 is shaped as a protrusion rather than being flat. In the embodiment, the end of the extending arm 75 is arc-shaped, but the present disclosure is not limited thereto. The extending arm 75 can serve to balance and restrict the valve plate 7a, 7b. Such geometric design can effectively restrict the center position of the valve plate 7a, 7b within a predetermined scope, and automatically calibrate the center position.

In this embodiment, the valve plate 7a, 7b has a flat upper surface and a flat lower surface. However, the present disclosure is not limited thereto. For example, a sealing side of the valve plates 7a, 7b still has a planar design, so as to ensure the sealing capacity. A non-sealing side of the valve plate 7a, 7b can be not limited to a plane, for example, the extending arm 75 may be slightly inclined. A gap is formed between an edge of the valve plate 7a, 7b and the first receiving trough 31, or the second receiving trough 32, so as to provide a point or line contact. Therefore, the gap can reduce the contact resistance of the extending arm 75a, and furthermore restrict an valid moving path of the valve plate 7a, 7b.

Figure 6:
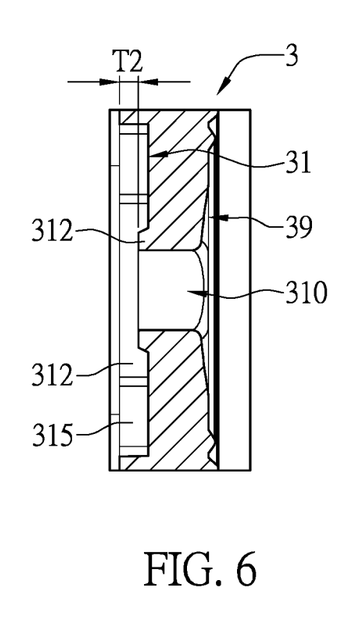
FIG. 6 is a cross-sectional view of the valve seat taken along line VI-VI of FIG. 5 of the present disclosure.

Reference is made to FIG. 4 and FIG. 6. In this embodiment, the sealing part 73 of the valve plate 7a, 7b is substantially circular and defined with a center C and a diameter A1. A length C1 from the center C of the sealing part 73 to an end of the extending arm 75 is 0.6 to 2.0 times a diameter A1 of the sealing part 73. In other words, a length protruding from the extending arm 75 to the sealing part 73 can be the diameter A1 of the sealing part 73. A width B1 of the extending arm 75 is 0.1 to 0.5 times the diameter A1 of the sealing part 73. When the length of the extending arm 75 is longer, the width thereof should be wider. If the friction drag between the extending arm 75 and the valve seat 3 is larger, the displacement of the valve plate 7a, 7b would be much more restricted.

A length from a center of the first runner gate 310 of the first receiving trough 31 to an end of the first receiving trough 31 is defined as C2. A length from a center of the second runner gate 320 of the second receiving trough 32 to an end of the second receiving trough 32 is defined as C2'. A length from a center of the sealing part 73 of the valve plate 7a, 7b to an end of the extending arm 75 is defined as C1. Therefore, the following relationship can be satisfied:

$$C2-C1 \le 0.2*C1;\ C2'-C1 \le 0.2*C1.$$

Such design of size has advantages that a minimum degree of freedom of the valve plates 7a, 7b can be ensured. The degree of freedom under this condition will not make the valve plates 7a, 7b escape from the sealing zone to affect sealing.

The arc at the end of the extending arm 75 has a radius R1, which is 0.3 to 0.5 times a width B1 of the extending arm 75. Such design of the size has advantages that, if the radius is within the range of 0.3 to 0.5 times the width, the arc angle of such ratio would be smoother, and the affect of friction would be smaller and with a better guidance quality.

Figure 7:
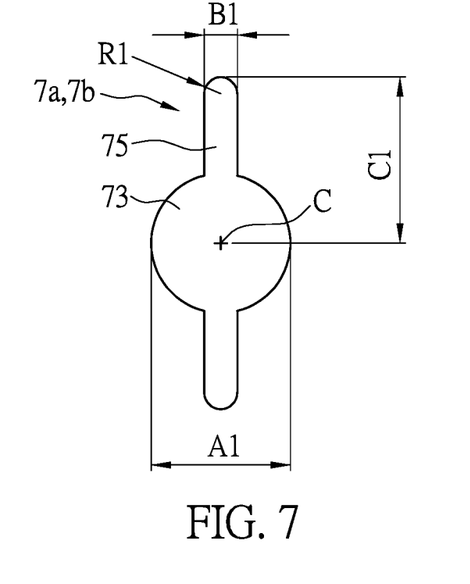
FIG. 7 is a top view of the valve seat of the present disclosure.
Figure 8:
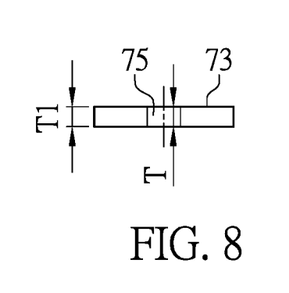
FIG. 8 is a front view of the valve plate of the present disclosure.

Reference is made to FIG. 6 to FIG. 8. FIG. 8 is a side view of the valve plate 7a, 7b. A thickness T of the sealing part 73 is equal to or larger than a thickness T1 of the extending arm 75. Such design of the size has advantages that, the extending arms 75 of the valve plates 7a, 7b themselves have the function of position restriction, so that the thickness T1 of the extending arm 73 of the valve plate 7a, 7b is not larger than a thickness T of the center of the valve plates 7a, 7b, which avoids blocking the movement of the valve plate centers, and avoids slowing the movement of the valve plate and effecting the adaptability. In addition, this can prevent the friction area from being too large and affecting the total freedom of the valve plate.

In addition, after the diaphragm pump of the present disclosure is tested, preferably, a thickness T1 of the extending arm 75 is equal to 0.5 to 1 times a depth T2 of the first receiving trough 31 or the second receiving trough 32. Such structural design has the effect that, the valve plate will not consume too much energy for positioning itself within such range. When the thickness T1 of the extending arm 75 is smaller than 0.5 times the depth of the receiving trough, the extending arm of the valve plate reaches the predetermined position early. However, an additional deformation of the extending arm is required to position the center of the valve plate at a predetermined position, which results in unnecessary energy loss and affects the effectiveness of time.

In the assumed condition that the thickness T1 of the extending arm 75 is larger than the depth of the receiving trough, after the valve plate center has reached the predetermined position, the extending arm will still not have reached its predetermined position. Such condition will result in an excessive deformation of the extending arm, which affects the sealing effectiveness of the valve plate center and causes unnecessary deformation of the valve plate itself to affect the stability. Beyond the above-designed size scope, the movement process will result in an excessive deformation of the valve plate itself, so as to cause a non-reversible deformation of the valve plate. This excessive deformation causes the valve plate to move ineffectively, so that the effectiveness of the diaphragm pump is seriously affected.

As shown in FIG. 5 and FIG. 7, a width B2 of the extending zone 315 of the first receiving trough 31, or a width B2' of the extending zone 325 of the second receiving trough 32 is larger than a width B1 of the extending arm 75. In this embodiment, a width B1 of the extending arm 75 is subtracted from a width B2 of the extending zone 315 of the first receiving trough 31, or a width B2' of the extending zone 325 of the second receiving trough 32, which is smaller than or equal to two times the width B1 of the extending arm 75. Therefore, the following relationship can be satisfied:

$$B2-B1 \leq 2*B1; \text{ or } B2'-B1 \leq 2*B1$$

The above size design has the advantages that the freedom under such condition can ensure that the extending arm 75 will not cause the center of the valve plate to escape from the sealing zone under such restriction. In addition, the freedom under such condition does not result in much friction during the movement process of the extending arm 75, so as to avoid affecting the free movement of the valve plate.

Figure 11:
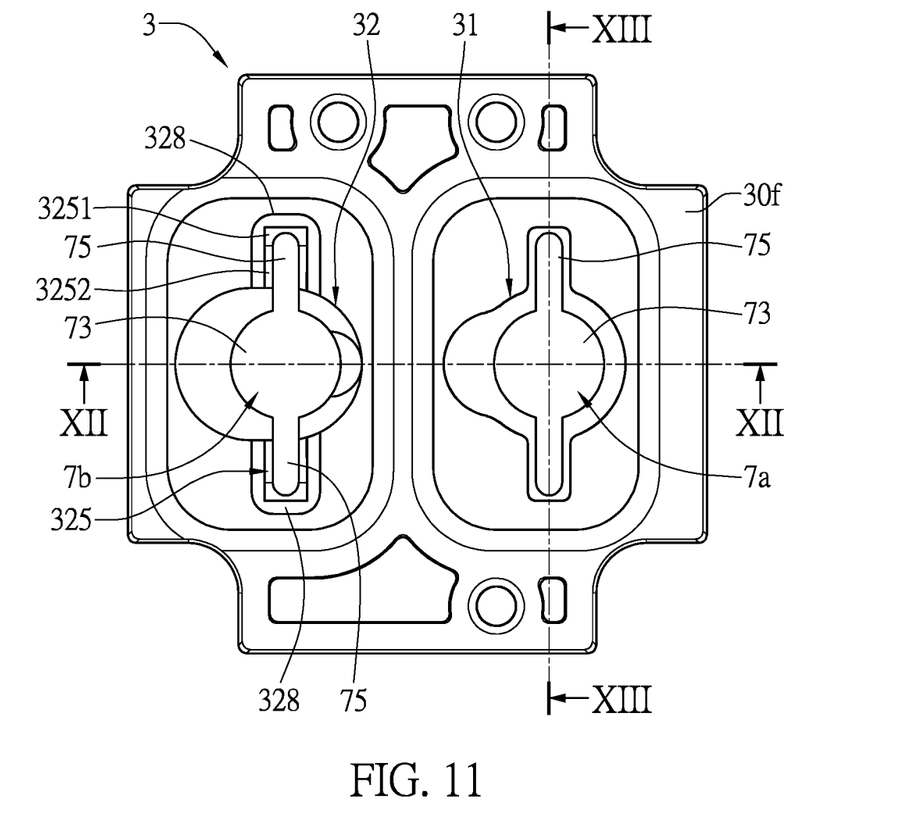
FIG. 11 is a top view of the valve plate assembled in the valve seat according to the present disclosure.
Figure 12:
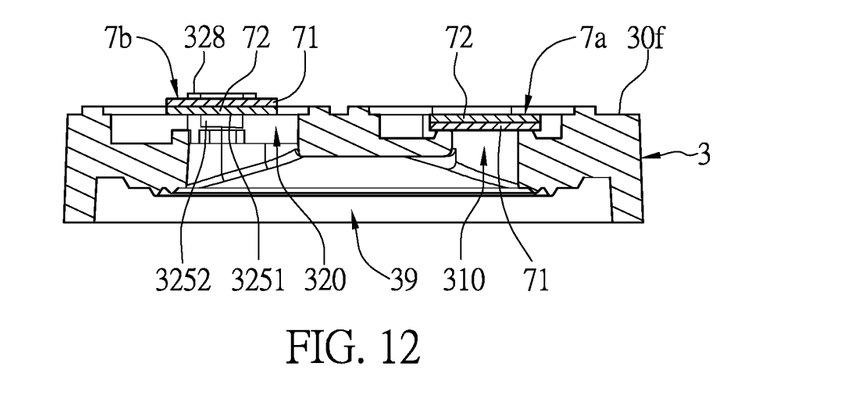
FIG. 12 is a cross-sectional view taken along line XII-XII of FIG. 11 of the present disclosure.
Figure 13:
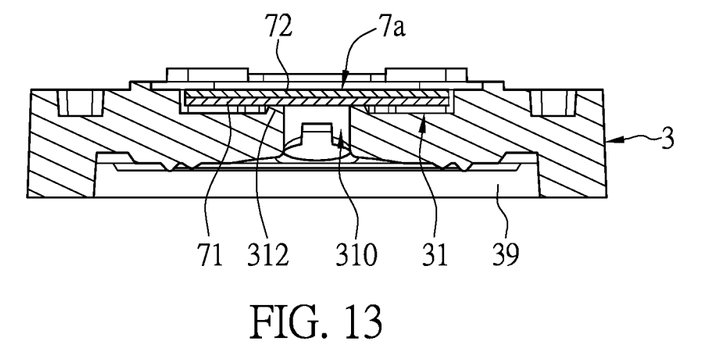
FIG. 13 is a cross-sectional view taken along line XIII-XIII of FIG. 11 of the present disclosure.

Reference is made to FIG. 11 to FIG. 13. FIG. 11 is a top view of the valve seat and the valve plate of the present disclosure. Each of the valve plates 7a, 7b has a sealing side 71 and a non-sealing side 72. In this embodiment, the valve plates 7a, 7b have different hardness on the sealing side 71 and the non-sealing side 72. In detail, the hardness of the sealing side 71 is smaller than the hardness of the non-sealing side 72. Such structure can be achieved by a gluing treatment or a hardening treatment on a partial area, or adhesion of two different material sheets. The sealing side 71 is preferably made of a material with softer hardness to enhance the sealing effect. The non-sealing side 72 can be made of a material with harder hardness to enhance the structural intensity. Such structural design has advantages that, first, the non-sealing side 72 will not be overly deformed due to the softness of the material, so as to avoid blocking a fluid runner area of the outlet to affect flow; and second, the geometric shapes of the valve plates 7a, 7b can increase the structural intensity, so as to avoid affecting the thickness and manufacturing process of the valve plates 7a, 7b.

An additional explanation is that, as shown in FIG. 11 and FIG. 12, after the valve plates 7a, 7b of this embodiment are disposed on the valve seat 3, they are positioned on different levels of height. The top surface of the valve plate 7a is flush with the top surface 30f of the valve seat 3. In other words, the non-sealing side 72 of the valve plate 7a is flush with the top surface 30f of the valve seat 3. The bottom surface of the valve plate 7b is flush with the top surface 30f of the valve seat 3. In other words, the non-sealing side 72 of the valve plate 7b is flush with the top surface 30f of the valve seat 3. The sealing side 71 of the valve plate 7b is higher than the top surface 30f of the valve seat 3, so that the sealing side 71 of the valve plate 7b directly abuts against the second upper chamber 42 of the head cover 4 during assembly. Such arrangement of the embodiment is beneficial to the installation of the valve plates 7a, 7b. By the above arrangement, the extending zone 325 of the second receiving trough 32 in the embodiment has an abutting surface 3251, and a ramp 3252. The abutting surface 3251 is close to an end of the extending zone 325, and the abutting surface 3251 supports the extending arm 75 of the valve plate 7b disposed thereon. The ramp 3252 extends toward the second runner gate 320 from the abutting surface 3251, and the ramp 3252 does not contact the extending arm 75 of the valve plate 7b.

Figure 14:
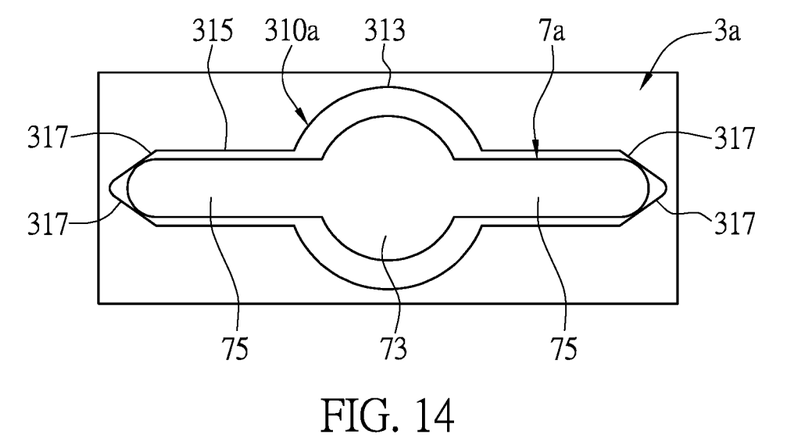
FIG. 14 is a top view of the valve plate assembled in the valve seat according to another embodiment of the present disclosure.

Reference is made to FIG. 14, which is a top view of a second embodiment of the valve seat of the present disclosure. This embodiment has the feature that the first receiving trough or the second receiving trough is formed with a pyramid-shaped extending zone. Taking a part of the valve seat 3a and the first receiving trough 310a for example, the first receiving trough 310a has a sealing-zone runner 313, and two extending zones 315 extending outwardly from the sealing-zone runner 313. The extending arm 75 of the valve plate 7a is disposed in the extending zone 315. Two sides of the extending zone 315 are parallel, and is distanced from the extending arm 75 by a gap. An end of the extending zone 315 is shaped in a pyramid. In detail, the end of the extending zone 315 has two slanted surfaces 317 facing each other, and the two slanted surfaces 317 contact an arced end of the extending arm 75, respectively. By such structural arrangement, two sides at the end of the extending arm 75 and the extending zone 315 form two contacting points, which provide a restriction with a better balance.

Figure 15:
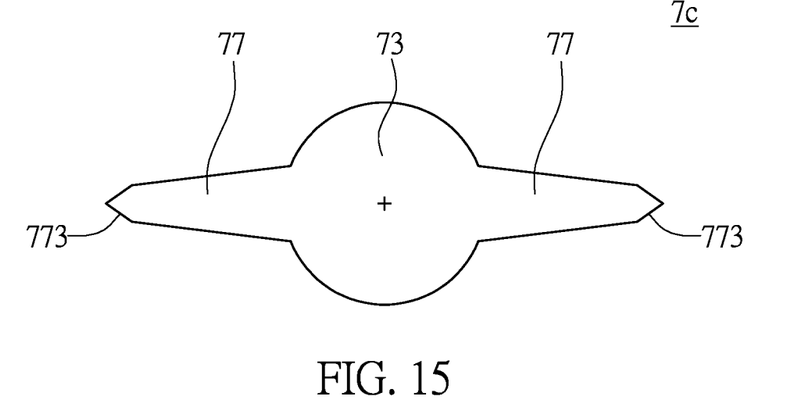
FIG. 15 is a top view of the valve plate according to another embodiment of the present disclosure.

Reference is made to FIG. 15, which is a top view of another embodiment of the valve plate of the present disclosure. The difference between this embodiment and the above embodiment is that, the valve plate 7c of this embodiment has a pair of extending arms 77 which extend outwardly and oppositely from the sealing part 73 in a tapered manner. In addition, an end of the extending arm 77 is pyramid-shaped and is formed with two oblique edges 773. The entirety of the valve plate 7c is symmetrical about its center in bilateral and top-down manners. In this embodiment, the extending zone of the valve seat may have a shape corresponding with the shape of the extending arm 77.

In conclusion, the present disclosure utilizes the valve plate and the valve seat that have corresponding geometric structures to effectively control a center position of the valve plate. In addition, the valve plate can provide a sealing effect with a shorter valid movement path and a smaller energy loss. Two sides of the valve plate have different hardness. Therefore, the non-sealing side will not be overly deformed, and the sealing side can achieve the sealing effect with a minimum valid movement path and minimum energy loss.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A diaphragm pump, comprising:
   a valve seat, formed with a first receiving trough and a second receiving trough, the first receiving trough having a first runner gate, the second receiving trough having a second runner gate;
   a head cover, covering the valve seat;
   a second valve plate having free movement, wherein the first valve plate being disposed in the first receiving trough, and the first receiving trough having a geometric shape corresponding with a geometric shape of the first valve plate; the second valve plate being disposed in the second receiving trough, and the second receiving trough has a geometric shape corresponding with that of the second valve plate;
   wherein each of the valve plates has a sealing part and a first extending arm, each first extending arm being extended outwardly from a partial periphery of the corresponding sealing part, each sealing part haying a bilaterally symmetrical geometric shape, each extending arm having an end shaped as a protrusion, a gap being formed between each valve plate and the corresponding receiving trough;
   wherein each of the valve plates has a flat upper surface and a flat lower surface; and wherein the second receiving trough has a sealing zone runner and an extending zone extending outwardly from the sealing zone runner to the at least partially flat end of the extending zone, and the extending zone has a bottom surface comprising abutting surface and a ramp, the abutting surface is adjacent to the at least partially flat end, the abutting surface supports the first extending arm of the second valve plate, the ramp is extended from the abutting surface toward the second runner gate, the ramp is not contacted with the first extending arm of the second valve plate;
   wherein an arc at the end of first extending arm has a radius, the radius is equal to 0.3 to 0.5 times a width of the first extending arm,
   further wherein the first extending arm of the second valve plate protrudes outwardly into the extending zone.

2. The diaphragm pump according to claim 1, wherein each valve plate has a second extending arm having an identical width to the corresponding first extending arm and extending arm from an opposite side of the corresponding valve plate from the corresponding first extending arm.

3. The diaphragm pump according to claim 1, wherein the sealing part of each valve plate has two circular arc segments sharing a common center and diameter, a length from each common center to the end of the corresponding extending arm is equal to 0.6 to 2.0 times the corresponding diameter.

4. The diaphragm pump according to claim 3, wherein a width of each first extending arm is equal to 0.1 to 0.5 times the diameter of the corresponding sealing part.

5. The diaphragm pump according to claim 1, wherein a length from a center of the first runner gate of the first receiving trough to an end of the first receiving trough is defined as $C2$, a length from a center of the second runner gate of the second receiving trough to the at least partially flat end of the second receiving trough is defined as $C2'$, a length from the center of each sealing part to the end of the corresponding first extending arm is defined as $C1$, wherein $C2-C1>-0.2*C1$, and $C2'-C1>-0.2*C1$.

6. The diaphragm pump according to claim 1, wherein a thickness of each sealing part is equal to or larger than a thickness of the corresponding first extending arm.

7. The diaphragm pump according to claim 1, wherein a thickness of the corresponding first extending arm is equal to 0.5 to 1 times a depth of the first receiving trough or the second receiving trough.

8. The diaphragm pump according to claim wherein the valve seat is formed with a positioning wall, the positioning wall is disposed around a partial periphery of the second receiving trough, so as to restrict the first extending arm of the second valve plate.

9. The diaphragm pump according to claim 1, wherein the uppwe surface of one of the first and second valve plates is flush with a top surface of the valve seat, the lower surface of the other one of the first and second valve plates is flush with the top surface of the valve seat.

10. A valve comprising:
    a valve plate having free movement, comprising
    a sealing part, and
    at least two extending arms having identical widths which are outwardly extended from the sealing part, the sealing part having two circular arc segments opposite to each other, each extending arm having a protruded end, the valve plate having a flat upper surface and a flat lower surface; and
    a valve seat formed with a receiving trough comprising a runner gate, sealing zone runner, and an extending zone which extends outwardly from the sealing zone runner and which receives one of the at least two extending arms,
    wherein the valve plate has a sealing side and a non-sealing side, a hardness of the sealing side is smaller than a hardness of the non-sealing side;
    wherein an arc at the end of each extending arm has a radius equal to 0.3 to 0.5 times its width, and
    wherein the sealing side moves relative to the valve seat to open and close the runner gate.

11. The valve plate according to claim 10, Wherein the sealing part of the valve plate is shaped in a circle and defined with a center and a diameter, a length from the center of the sealing part to the end of the each extending arm is equal to 0.6 to 2.0 times the diameter of the sealing part.

12. The valve plate according to claim 10, wherein the width of each extending arm is equal to 0.1 to 0.5 times the diameter of the sealing part.

13. The valve plate according to claim 10 wherein a thickness of the sealing part is equal to or larger than a thickness of each extending arm.

* * * * *